(No Model.)
C. ROBERTS.
CORN SHELLER.
No. 458,024. Patented Aug. 18, 1891.
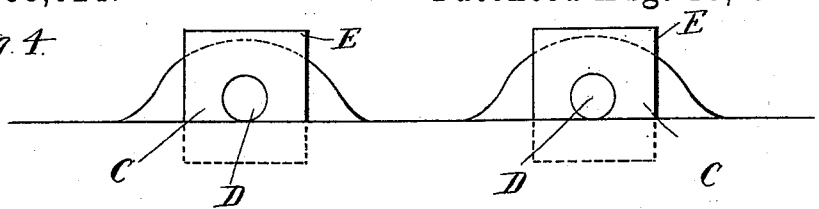
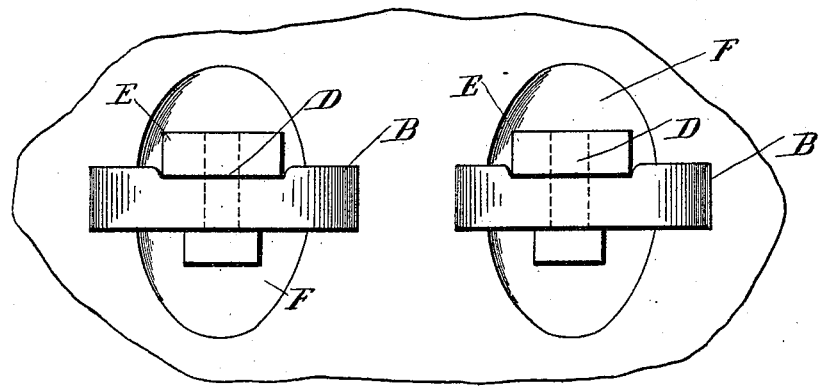
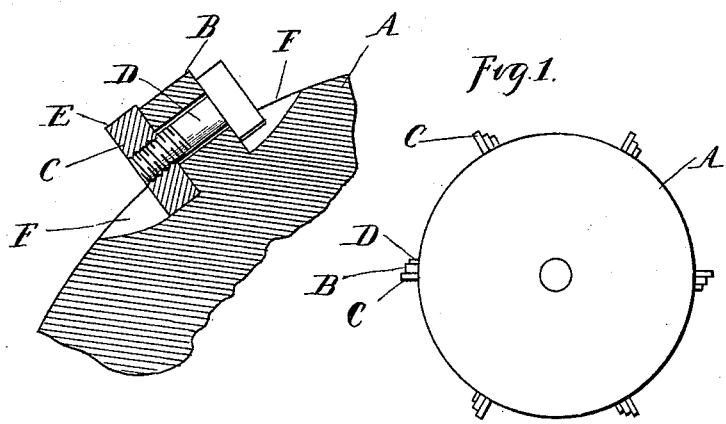
Witnesses
A. L. Hobbie
W. B. O'Dogherty
Inventor
Cyrus Roberts
By Thos. Sprague & Son
Atty.

UNITED STATES PATENT OFFICE.

CYRUS ROBERTS, OF THREE RIVERS, MICHIGAN.

CORN-SHELLER.

SPECIFICATION forming part of Letters Patent No. 458,024, dated August 18, 1891.

Application filed January 28, 1891. Serial No. 379,462. (No model.)

*To all whom it may concern:*

Be it known that I, CYRUS ROBERTS, a citizen of the United States, residing at Three Rivers, in the county of St. Joseph and State of Michigan, have invented certain new and useful Improvements in Corn-Shellers, of which the following is a specification, reference being had therein to the accompanying drawings.

This invention relates to new and useful improvements in corn-shellers; and the invention consists in the peculiar construction of the shelling-cylinder, all as more fully hereinafter described.

In the drawings, Figure 1 is an end elevation of my improved cylinder. Fig. 2 is an enlarged cross-section through one of the shelling-teeth. Fig. 3 is an enlarged plan of two contiguous shelling-teeth, and Fig. 4 is a corresponding elevation of the same.

A is the body of the cylinder, preferably made of cast metal and provided upon its outer surface with radial projecting lugs B, to which the shelling-teeth C are attached. These teeth are made in the form of a nut centrally screw-threaded to the lugs B by means of screws D, passing through a suitable aperture in the lug, the relative construction and arrangement of the parts being such that the outer edges of the nut project beyond the flanges B and form a cutting-edge E, the rest of the nut being backed against the lug. A suitable recess F is preferably formed in the face of the cylinder to receive the inner end of the shelling-teeth of the nut. I also provide the lugs B with a depressed face, as shown in Fig. 3, whereby the turning of the nut is prevented, so that its cutting-edge cannot be accidentally displaced from its parallelism with the axis of the cylinder.

I do not limit myself to any special arrangement of such teeth upon the surface of the cylinder, as the same may be arranged in any of the known ways.

It will be seen that my construction has the advantage that after one cutting-edge of the teeth is worn away another one may be brought in place by altering the position of the nut, and it will be seen that by making the nut square and reversible eight cutting-edges are provided. I do not, however, necessarily confine myself to a nut with eight cutting-edges, as with a less number of serviceable cutting-edges my construction would still form a desirable improvement.

What I claim as my invention is—

1. In a corn-sheller, a cylinder having a series of recesses in its surface, a series of radial apertured securing-lugs on the recessed portions of the cylinder formed with depressed front faces, and reversible teeth adjustably secured in the depressions of the lugs, substantially as described.

2. In a corn-sheller, a cylinder having a series of radial securing-lugs thereon formed with depressed front faces and having apertures extending therethrough, and reversible teeth secured in the depressions of the lugs, substantially as described.

In testimony whereof I affix my signature in presence of two witnesses.

CYRUS ROBERTS.

Witnesses:
M. B. O'DOGHERTY,
N. L. LINDOP.